US011174603B2

(12) United States Patent
Reinke et al.

(10) Patent No.: US 11,174,603 B2
(45) Date of Patent: *Nov. 16, 2021

(54) PROCESS FOR COLD-IN-PLACE RECYCLING USING FOAMED ASPHALT AND LUBRICATION ADDITIVE

(71) Applicants: ALM HOLDING CO., Onalaska, WI (US); Ergon Asphalt & Emulsions, Inc., Jackson, MS (US)

(72) Inventors: Gerald H. Reinke, La Crosse, WI (US); David Lange, La Crosse, WI (US); Gaylon L. Baumgardner, Arkadelphia, AR (US); Ervin Dukatz, La Crosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/910,709

(22) Filed: Mar. 2, 2018

(65) Prior Publication Data
US 2018/0187385 A1 Jul. 5, 2018

Related U.S. Application Data

(63) Continuation of application No. 14/873,870, filed on Oct. 2, 2015, now abandoned, which is a continuation of application No. 14/717,628, filed on May 20, 2015, now abandoned, which is a continuation of application No. 14/597,465, filed on Jan. 15, 2015, now abandoned, which is a continuation of application No. 12/536,065, filed on Aug. 5, 2009, now Pat. No. 8,962,071.

(Continued)

(51) Int. Cl.
| | |
|---|---|
| C04B 26/26 | (2006.01) |
| C09D 195/00 | (2006.01) |
| C08J 9/00 | (2006.01) |
| E01C 23/06 | (2006.01) |
| E01C 19/10 | (2006.01) |
| E01C 19/05 | (2006.01) |
| E01C 19/16 | (2006.01) |
| E01C 7/18 | (2006.01) |
| E01C 7/22 | (2006.01) |
| E01C 7/26 | (2006.01) |
| E01C 7/08 | (2006.01) |
| E01C 7/35 | (2006.01) |
| C08L 95/00 | (2006.01) |
| E01C 11/00 | (2006.01) |
| E01C 19/08 | (2006.01) |
| E01C 7/20 | (2006.01) |
| E01C 23/12 | (2006.01) |
| C04B 111/00 | (2006.01) |

(52) U.S. Cl.
CPC ............ *E01C 23/065* (2013.01); *C04B 26/26* (2013.01); *C08J 9/00* (2013.01); *C08L 95/00* (2013.01); *C08L 95/005* (2013.01); *C09D 195/005* (2013.01); *E01C 7/08* (2013.01); *E01C 7/18* (2013.01); *E01C 7/187* (2013.01); *E01C 7/20* (2013.01); *E01C 7/22* (2013.01); *E01C 7/265* (2013.01); *E01C 7/353* (2013.01); *E01C 11/005* (2013.01); *E01C 19/05* (2013.01); *E01C 19/08* (2013.01); *E01C 19/1004* (2013.01); *E01C 19/16* (2013.01); *E01C 23/12* (2013.01); *C04B 2111/0075* (2013.01); *C08J 2395/00* (2013.01); *C08L 2555/22* (2013.01); *E01C 2301/50* (2013.01); *Y02A 30/30* (2018.01); *Y02W 30/91* (2015.05); *Y10T 428/2991* (2015.01)

(58) Field of Classification Search
CPC .......... E01C 23/065; E01C 23/12; E01C 7/08; E01C 7/18; E01C 7/187; E01C 7/20; E01C 7/22; E01C 7/265; E01C 7/353; E01C 19/05; E01C 19/08; E01C 19/1004; E01C 19/16; E01C 11/005; C08J 9/00; C04B 26/26; C08L 95/005; C08L 95/00; C09D 195/005
See application file for complete search history.

(56) References Cited

U.S. PATENT DOCUMENTS

| | | |
|---|---|---|
| 1,014,103 A | 1/1912 | Wallbaum |
| 1,373,661 A | 4/1921 | Johansen |

(Continued)

FOREIGN PATENT DOCUMENTS

| | | |
|---|---|---|
| AU | 433003 | 2/1973 |
| AU | 2006231250 | 10/2006 |

(Continued)

OTHER PUBLICATIONS

John Emery; Practical Experience with Emulsion Cold In-Place Recycling and Foamed Asphalt Full Depth Reclamation; 4th International SIIV Congress—Palermo (Italy); Sep. 12-14, 2007. (Year: 2007).*

(Continued)

*Primary Examiner* — Michael P Wieczorek
(74) *Attorney, Agent, or Firm* — Kagan Binder, PLLC

(57) ABSTRACT

Cold-in-place asphalt recycling is disclosed. A foamed asphalt may be produced by injecting water and optionally compressed air into a hot asphalt stream. A lubricating surfactant may be added to the hot asphalt stream to improve performance. The foamed asphalt may be mixed with reclaimed material to provide a uniformly coated paving material that can compacted to a desired density.

20 Claims, No Drawings

Related U.S. Application Data

(60) Provisional application No. 61/086,331, filed on Aug. 5, 2008.

(56) References Cited

U.S. PATENT DOCUMENTS

| | | | |
|---|---|---|---|
| 1,384,805 A | 7/1921 | McSwiney | |
| 1,542,626 A | 6/1925 | MacKay | |
| 1,640,544 A | 8/1927 | Headley | |
| 1,674,523 A | 6/1928 | Sadtler | |
| 1,778,760 A | 10/1930 | Hay | |
| 1,815,089 A | 7/1931 | Alsdorf | |
| 1,834,552 A | 12/1931 | Sad tier et al. | |
| 1,842,139 A | 1/1932 | Alsdorf | |
| 1,887,518 A | 11/1932 | Sadtler | |
| 1,888,295 A | 11/1932 | Smith | |
| 1,932,648 A | 10/1933 | Taylor | |
| 1,948,881 A | 2/1934 | Kirschbraun | |
| 1,988,336 A | 1/1935 | Roedinger | |
| 1,988,879 A | 1/1935 | Steininger | |
| 2,023,068 A | 12/1935 | Flood | |
| 2,025,945 A | 12/1935 | Forrest | |
| 2,046,902 A | 7/1936 | Kirschbraun | |
| 2,087,401 A | 7/1937 | Fair | |
| 2,191,295 A | 2/1940 | Dohse | |
| 2,243,519 A | 5/1941 | Barth | |
| 2,283,192 A | 5/1942 | Ditto | |
| 2,317,959 A | 4/1943 | Johnson et al. | |
| 2,340,449 A | 2/1944 | Barwell | |
| 2,374,732 A | 5/1945 | Colbum | |
| 2,427,488 A | 9/1947 | Anderson et al. | |
| 2,461,971 A | 2/1949 | Fischer | |
| 2,550,481 A | 4/1951 | Jense | |
| 2,861,787 A | 11/1958 | Csanyi | |
| 2,888,418 A | 5/1959 | Albanese et al. | |
| 2,901,369 A | 8/1959 | Pordes | |
| 2,917,395 A | 12/1959 | Csanyi | |
| 3,855,167 A | 12/1974 | Bowman | |
| 3,904,428 A | 9/1975 | McConnaughay | |
| 4,197,209 A | 4/1980 | Zinke et al. | |
| 4,198,177 A | 4/1980 | Brett et al. | |
| 4,234,346 A | 11/1980 | Latta, Jr. et al. | |
| 4,244,747 A | 1/1981 | Leonard, Jr. et al. | |
| 4,317,642 A | 3/1982 | Wirtgen | |
| 4,348,237 A | 9/1982 | Ruckel | |
| 4,592,507 A | 6/1986 | Benedict | |
| 4,692,350 A * | 9/1987 | Clarke | E01C 19/176 106/122 |
| 4,724,003 A | 2/1988 | Treybig et al. | |
| 4,743,304 A | 5/1988 | Gilmore et al. | |
| 4,836,857 A | 6/1989 | Hopkins | |
| 4,946,307 A | 8/1990 | Jakob | |
| 5,109,041 A | 4/1992 | Matsuno et al. | |
| 5,441,361 A | 8/1995 | Campbell | |
| 5,539,029 A | 7/1996 | Burris | |
| 5,622,554 A | 4/1997 | Krogh et al. | |
| 5,721,296 A | 2/1998 | Mizunuma et al. | |
| 5,766,333 A * | 6/1998 | Lukens | C08L 95/00 106/280 |
| 5,772,749 A | 6/1998 | Schilling et al. | |
| 5,788,755 A | 8/1998 | Salminen | |
| 5,827,360 A | 10/1998 | Salminen | |
| 5,925,233 A | 7/1999 | Miller et al. | |
| 5,928,418 A | 7/1999 | Tamaiki et al. | |
| 6,114,418 A * | 9/2000 | Isobe | C08J 3/03 106/277 |
| 6,136,898 A | 10/2000 | Loza et al. | |
| 6,197,837 B1 | 3/2001 | Hill et al. | |
| 6,451,885 B1 | 9/2002 | Dresin et al. | |
| 6,494,944 B1 * | 12/2002 | Wates | B01F 17/0042 106/277 |
| 6,559,206 B1 | 5/2003 | Durand et al. | |
| 6,576,050 B1 | 6/2003 | Samanos | |
| 6,588,974 B2 | 7/2003 | Hildebrand et al. | |
| 6,599,057 B2 * | 7/2003 | Thomas | C08L 95/00 404/72 |
| 6,793,964 B2 | 9/2004 | Hoad | |
| 6,846,354 B2 | 1/2005 | Larsen et al. | |
| 6,913,416 B2 | 7/2005 | Hildebrand et al. | |
| 7,041,165 B2 | 5/2006 | Malot | |
| 7,114,843 B2 | 10/2006 | Romier et al. | |
| 7,114,875 B2 | 10/2006 | Romier et al. | |
| 7,160,943 B2 | 1/2007 | Burris et al. | |
| 7,297,204 B2 | 11/2007 | Crews et al. | |
| 7,309,390 B2 | 12/2007 | Falkiewicz | |
| 7,815,725 B2 | 10/2010 | Reinke et al. | |
| 7,968,627 B2 | 6/2011 | Reinke et al. | |
| 7,981,466 B2 | 7/2011 | Reinke et al. | |
| 7,981,952 B2 | 7/2011 | Reinke et al. | |
| 8,962,071 B2 * | 2/2015 | Reinke | C04B 26/26 427/138 |
| 2002/0170464 A1 | 11/2002 | Larsen et al. | |
| 2004/0014845 A1 | 1/2004 | Takamura et al. | |
| 2004/0223808 A1 | 11/2004 | Romier et al. | |
| 2004/0244646 A1 | 12/2004 | Larsen et al. | |
| 2005/0018530 A1 | 1/2005 | Romier et al. | |
| 2005/0284333 A1 | 12/2005 | Falkiewicz | |
| 2006/0086288 A1 | 4/2006 | Bourrel et al. | |
| 2006/0169173 A1 | 8/2006 | Dupuis et al. | |
| 2006/0236614 A1 | 10/2006 | Antoine et al. | |
| 2006/0240185 A1 | 10/2006 | Antoine et al. | |
| 2006/0288907 A1 | 12/2006 | Fox | |
| 2007/0039520 A1 | 2/2007 | Crews et al. | |
| 2007/0060676 A1 * | 3/2007 | Reinke | C08L 95/00 524/59 |
| 2007/0082983 A1 | 4/2007 | Crews et al. | |
| 2007/0169668 A1 | 7/2007 | Moss et al. | |
| 2007/0191514 A1 | 8/2007 | Reinke et al. | |
| 2009/0088499 A1 | 4/2009 | Barreto et al. | |
| 2011/0017096 A1 | 1/2011 | Reinke | |
| 2011/0020537 A1 | 1/2011 | Reinke | |
| 2015/0147118 A1 | 5/2015 | Reinke et al. | |

FOREIGN PATENT DOCUMENTS

| | | |
|---|---|---|
| CN | 1644625 | 12/2004 |
| EP | 0568021 | 11/1993 |
| EP | 1052334 A2 | 5/2000 |
| EP | 1398351 | 3/2004 |
| EP | 1263885 | 6/2004 |
| EP | 1469038 | 10/2004 |
| EP | 0994923 | 1/2006 |
| GB | 429548 | 5/1935 |
| GB | 783015 | 9/1957 |
| GB | 2234512 | 8/1989 |
| JP | 2002/332606 | 11/2002 |
| JP | 2006/132131 | 5/2006 |
| WO | WO 1995/22661 | 8/1995 |
| WO | WO 1999-57199 | 11/1999 |
| WO | WO 2001/16233 | 3/2001 |
| WO | WO 2001/162852 | 8/2001 |
| WO | WO 2002/016499 | 2/2002 |
| WO | WO 2002/0103116 | 12/2002 |
| WO | WO 2005/081775 | 9/2005 |
| WO | WO 2006/106222 | 10/2006 |
| WO | 2007/013117 A1 | 1/2007 |
| WO | WO 2007/032915 | 3/2007 |
| WO | WO 2007/112335 | 10/2007 |
| WO | WO 2008/148974 | 12/2008 |
| WO | WO 2009/033060 | 3/2009 |

OTHER PUBLICATIONS

Department of Transportation Minnesota, "Recycled Pavements Using Foamed Asphalt in Minnesota", Report No. MN/RC 2009-09, 55 pages, Feb. 2009.

"Use of Foamed Asphalt with Cold-In-Place Recycling and Full Depth Reclamation", Local Road Research Board, 2 pages, Feb. 2009.

Romanoschi et al.; Foamed Asphalt Stabilized Reclaimed Asphalt Pavement: A Promising Technology for Mid-Western Roads; Pro-

(56) References Cited

OTHER PUBLICATIONS ceedings of the 2003 Mid-Gontinent Transporation Research Symposium, Ames, Iowa, 11 pages, Aug. 2003.
Ramanujam et al.; Foam Bitumen Trial at Gladfield—Cunningham Highway; Southern Region Symposium; 10 pages, Nov. 20-22, 1997.
Edwards et al., "Rheological effects of commercial waxes and polyphosphoric acid in bitumen 160/220—low temperature performance", Fuel 85, pp. 989-997, Apr. 20, 2005.
K.M. Muthen, "Foamed Asphalt Mixes" Mix Design Procedure, Contract Report CR-98/077, Dec. 1998, 36 pages.
Samuel Oluwatosin Abiodun "Cold In-Place Recycling with Expanded Asphalt Mix (Ciream)", A Thesis Submitted to the Department of Chemistry in conformity with the requirements for the degree of Master of Science, Queen's University, Kingston, Ontario, Canada, Apr. 2014, 104 pages.
Hosin "David" Lee et al., "Laboratory Performance Evaluation of CIR-Emulsion and its Comparison Against CIR-Foam Test Results from Phase 2", Sponsored by Iowa Highway Research Board, Public Policy Center University of Iowa, Final Report TR-474, Dec. 2009, 104 pages.
John J. Emery, Ph.D., P. Eng., "Practical Experience with Emulsion Cold In-Place Recycling and Foamed Asphalt Full Depth Reclamation", 4th International SIIV Congress—Palermo (Italy), Sep. 12-14, 2007, 21 pages.
Bonola et al., "Technologies for the Production of Asphalt Mixes With Low Temperature Processes," World Road Association Italian National Committee, Dec. 2005, 27 pp.
Barreto, "Warm Asphalt Mixes Containing Dispersed Water," ARKEMA-CECA France, Abstract No. 658, 2006, 7 pp.
Krist Jansdorttir, "Warm Mix Asphalt for Cold Weather Paving, "Warm Mix Asphalt for Cold Weather Paving, a thesis, University of Washington, 2006, 127 pp.
Koenders et al., "Innovative process in asphalt production and application to obtain lower operating temperatures," 2nd Eurasphalt & Eurobitume Congress Barcelona 2000, Book II, pp. 830-840.
Jenkins et al., "Half-Warm Foamed Bitumen Treatment, A New Process," 7th Conference on Asphalt Pavements For Southern Africa, 1999, 17 pp.
Low Energy Asphalt (LEA) with the Performance of Hot-Mix Asphalt (HMA), European Roads Review, Special Issue, BGRA, Feb. 2004 (pp. 1-11).
International Search Report issued in PCT/US2006/33907, dated Sep. 24, 2007, 4 pages.
AKZO International Highway Chemical Newsletter, Chemical Division, Spring 1989, pp. 1-9.
Anderson, David A., et al., "The Effect of Antistrip Additives on the Properties of Asphalt Cement," Asphalt Paving Technology 1982, Proceedings Association of Asphalt Paving Technologists Technical Sessions, Kansas City, Missouri, vol. 51, Feb. 22, 23 & 24, 1982, pp. 298-317.
Ceca Arkema Group, "Green Road Formulation—Warm Asphalt Mix. 2007 Innovation: helping to lower our planet's temperature," www.siliporite.com, accessed Nov. 21, 2007, 1 pg.
Cervarich, "Cooling Down the Mix" NAPA Explores New "Warm Mix Asphalt" Technologies Developed in Europe, Hot Mix Asphalt Technology, Mar./Apr. 2003, pp. 13-16.
Choi, Y., Warm Asphalt Review, Austroads Report, Arrb Research, RETT220B, Publication No. AP-T91/07, Nov. 2007.
Damm, K., Abraham, J., Butz, T., Hildebrand, G., Riebesehl, G., "Asphalt Flow Improvers as Intelligent Fillers for Hot Asphalts—A New Chapter in Asphalt Technology," Journal of Applied Asphalt Binder, vol. 2, Issue 1, p. 36-70, Apr. 2002.
Diefenderfer et al., "Research Report: Installation of Warm Mix Asphalt Projects in Virginia," Virginia Transportation Research Council, Apr. 2007, 34 pp.
Gibson, Nelson, Modified Asphalt Research Activities at FHWA's Turner-Fairbank Highway Research Center (TFHRC), Pavement Materials and Construction Team, AMAP Conference, Feb. 2005, Orlando, FL, 18 pages.
Goh et al., "Laboratory Evaluation and Pavement Design for Warm Mix Asphalt," Proceedings of the 2007 Mid-Continent Transportation Research Symposium, Ames, IA, Aug. 2007, 11 pp.
Gudimettla, Jagan M., et al., "Workability of Hot Mix Asphalt," National Center for Asphalt Technology, Apr. 2003, 66 pages.
Hurley et al., "Evaluation of Aspha-Min™ Zeolite for Use in Warm Mix Asphalt," National Center for Asphalt Technology Report, Auburn University, 30 pp., Jun. 2005.
Hurley et al., "Evaluation of Evotherm™ for Use in Warm Mix Asphalt," National Center for Asphalt Technology Report, Auburn University, Jun. 2006, 49 pp.
Hurley et al., "Evaluation of Potential Processes for Use in Warm Mix Asphalt," National Center for Asphalt Technology, 2006, 46 pp.
Hurley, Graham C., et al., "Evaluation of Sasobit™ for Use in Warm Mix Asphalt," National Center for Asphalt Technology Report, Auburn University, Jun. 2005, 32 pp.
International Search Report and Written Opinion issued in PCT/US2008/075452, dated Feb. 13, 2009, 3 pages.
International Search Report for PCT/US2009/034742, dated May 26, 2009, 10 pages.
James, A.D., et al., "Adhesion Agents for Use in Hot Mixes and Cut-Back Bitumients," presented at the $3^{rd}$ IRF Middle East Regional Meeting, Riyadh, Saudi Arabia, 1988, 10 pages.
Jones, "Warm Mix Asphalt Pavements: Technology of the Future?" Asphalt, Fall 2004, pp. 8-11.
LaPointe, Dennis G., e-mail correspondence, May 2011, 4 pages.
Lavin, Patrick, "Asphalt Pavements: A practical guide to design, production and maintenance for engineers and architects," 2003, p. 347.
Logaraj, Sundaram, et al., "Surface-active bitumen additive for warm mix asphalt with adhesion promoting properties," 2009, 12 pages.
Malick, R.BN, Bradley, J.E., Bradbury, R.L., An Evaluation of Heated Reclaimed Asphalt Pavement (RAP) Material and Wax Modified Asphalt for Use in Recycled Hot Mix Asphalt (HMA), 2007.
Naidoo, P., "Fischer-Tropsch Hard Wax Chemistry in Warm Mix Asphalt Applications," Petersen Asphalt Research Conference, Abstract and Presentation Slides, Jun. 20-22, 2005.
Naidoo, P., Sasobit in Warm Mix Asphalt Applications 9 Years of Global Successes, World Asphalt Conference Presentation Slides, Mar. 14, 2006.
Paez, R., "Production of Modifier Asphalt Additives in Equator," 2005 International Symposium on Pavement Recycling, Sau Paulo, Brazil, Mar. 14-16, 2005, pp. 1-11.
Progress Report 2006, The German Bitumen Forum, Jun. 2006, 36 pp.
Schwartz, Anthony M., et al., Surface Active Agents and Detergents, vol. 2, 1977, pp. 673-677.
Tarrer, A.R., et al., "The Effect of the Physical and Chemical Characteristics of the Aggregate on Bonding," Strategic Highway Research Program, Feb. 1991, 31 pages.
Iterchimica Company; "Abstract of the 2005 production categories and applications," Iterchimica Brochure, p. 2 (2005).
Giannattasio, Allessandro, "To improve the quality of road bitumen," Reprint from the Italian Building and Construction Issue No. 69/1998-$19^{th}$ Year; pp. 2, 3, 7.
Petersen, J. Claine, "Relationships Between Asphalt Chemical Composition and Performance-Related Properties," ISSA Meeting, Phoenix Arizona, Jan. 23-27, 1982, $10^{th}$ page.
Declaration of Patrick Lavin, Jun. 6, 2011.
"Voyager on its travels," published in Road Recycling Jun. 2007 (Hot Recycling), 2 pgs.
Butz, Thorsten, et al., "Modification of Road Bitumens with the Fischer-Tropsch Paraffin Sasobit," Journal of Applied Asphalt Binder Technology, vol. 1, Issue 2, Oct. 2001, pp. 70-86.
Gaudefroy, Vincent, et al., "Laboratory Investigations on the Mechanical Performances of Foamed Bitumen Mixes Using Half-Warm Aggregates," TRB 2007 Annual Meeting CD-ROM, submitted August 1, 2006, 20 pgs.
Kanitpong, Kunnawee, et al., "Laboratory Study on Warm Mix Asphalt Additives," Paper No. 07-1364, TRB 2007 Annual Meeting CD-ROM, 20 pgs.

(56) References Cited

OTHER PUBLICATIONS

Prowell, Brian D., et al., "Field Performance of Warm Mix Asphalt at the NCAT Test Track," Paper No. 07-2514, TRB 2007 Annual Meeting CD-ROM, 15 pgs.
Kristjansdottir, Olof, et al., "Assessing the Potential for Warm Mix Asphalt Technology Adoption," TRB 2007 Annual Meeting CD-ROM, 19pgs.
Wasiuddin, Nazimuddin M., et al., "A Comparative Laboratory Study of Sasobit and Aspha-Min in Warm Mix Asphalt," TRB 2007 Annual Meeting CD-ROM, submitted Aug. 1, 2006, pp. 1-12.
Sasobit Product Information, Roads and Trials with SASOBIT, Oct. 2005, 7 pgs.
Modern Asphalts, "A safer future through designing for maintenance," Autumn 2006, Issue No. 18, 4 pgs.
D'Angelo, John, et al., "Warm-Mix Asphalt: European Practice," International Technology Scanning Program, Feb. 2008, 62 pgs.
Florida Department of Transporation, Standard Specifications for Road and Bridge Construction, 2007, pp. 244-252 and 772-784.
Transportation Research Board of the National Academies, 86th Annual Meeting agenda Jan. 21-25, 2007, 37 pgs.
International Search Report and Written Opinion issued in PCT/US2009/052830, dated Sep. 16, 2010, 9 pgs.
John Emery: Preactical Experience with Emulsion Cold In-Place Recycling and Foamed Asphalt Full Depth Reclamation; 4th International SIIV Congress—Palermo (Italy); Sep. 12-14, 2007.
Yongjoo Kim, "Development of Mix Design Procedure for Cold In-Place Recycling with Foamed Asphalt", Journal of Materials in Civil Engineering, vol. 18, Issue 1, Feb. 2006.

\* cited by examiner

PROCESS FOR COLD-IN-PLACE RECYCLING USING FOAMED ASPHALT AND LUBRICATION ADDITIVE

CROSS-REFERENCE TO RELATED APPLICATION

This application is a continuation of U.S. patent application Ser. No. 14/873,870, filed Oct. 2, 2015, which is a continuation of U.S. patent application Ser. No. 14/717,628, filed May 20, 2015, which is a continuation of U.S. patent application Ser. No. 14/597,465, filed Jan. 15, 2015, which is a continuation of U.S. patent application Ser. No. 12/536,065, filed Aug. 5, 2009, now U.S. Pat. No. 8,962,071, issued Feb. 24, 2015, which claims benefit of priority of U.S. Provisional Application No. 61/086,331, filed Aug. 5, 2008, the entire contents of each of the cited applications which are incorporated herein by this reference.

TECHNICAL FIELD

The disclosure pertains to asphalt processing and more particularly to cold-in-place asphalt recycling.

BACKGROUND

Cold-in-place recycling, commonly referred to as CIR, is a process where an existing bituminous pavement or a combination of bituminous pavement and untreated aggregate are milled or ground from a pavement surface to a depth of up to 6 inches, combined with a virgin bituminous material, mixed, and repaved without removal of the materials from the existing grade.

SUMMARY

The invention is directed to Improved processes for cold-in-place recycling of asphalt. In one embodiment, the invention is a cold-in-place recycling method in which an ethoxylated diamine surfactant and water are mixed with an asphalt binder to form a foamed composition of the surfactant and asphalt. The foamed composition of the surfactant and asphalt is mixed with milled recycled pavement to provide a uniformly coated paving material that can be compacted to a desired density.

In another embodiment, the invention is a foamed cold-in-place recycling method in which a foamed asphalt binder is produced by injecting one or more of water and a compressed air stream into a liquid asphalt stream that includes a lubricating surfactant. The foamed asphalt binder is combined with bituminous material in a continuous mixing process to produce a recycled bituminous mix. The recycled bituminous mix is conveyed into a paver and is then paved onto an existing grade.

In another embodiment, the invention is a foamed cold-in-place recycling method in which a foamed asphalt binder is produced by combining water and a lubricating surfactant into a liquid asphalt stream. The foamed asphalt binder is combined with bituminous material in a continuous mixing process to produce a recycled bituminous mix. The recycled bituminous mix is conveyed into a paver and is then paved onto an existing grade.

While multiple embodiments are disclosed, still other embodiments of the present invention will become apparent to those skilled in the art from the following detailed description, which shows and describes illustrative embodiments of the invention. Accordingly, the detailed description is to be regarded as illustrative in nature and not restrictive.

DETAILED DESCRIPTION

The invention pertains to improved CIR processes in which a lubricating additive is added to a foaming asphalt binder. This provides better coating, easier construction, improved compaction, and reduced processing temperatures. One indication of improved coating is the richer color of the paving material, as the more uniform the coating, the darker the color. The duller, browner color of conventional CIR foamed mix is observed when all of the particles are not coated. A firmer mat is also an indication that the binder is coated or more uniformly spread over all the particles rather than having small globules of asphalt interspersed among the fine aggregate particles.

CIR Recycling

CIR recycling is a process in which an existing bituminous pavement or a combination of bituminous pavement and untreated aggregate are milled or ground from a pavement surface to a depth of several inches, combined with a foamed asphalt material, mixed, and repaved. In some embodiments, CIR recycling involves a train method in which a number of pieces of equipment are arranged, in order, to accomplish each of these tasks on site.

For example, in a train method, a milling machine may be positioned at the front of the line to mill existing pavement down a desired depth. A hammer mill crusher may be located behind the milling machine, or "downstream" with respect to the flow of materials, such that the hammer mill crusher (or another type of mill or crusher) receives the milled bituminous material from the milling machine. A pug mill may be located downstream of the hammer mill crusher to mix the milled and crushed material with a foamed asphalt binder in a continuous process. A tanker or other truck holding hot asphalt may be disposed between the hammer mill crusher and the pug mill.

Once the material has been mixed, it can be deposited on the road and transferred to a paver using a pickup machine. In some cases, the material can be dumped from the pug mill directly into the paver. The paver lays the mix and the mix is then rolled or compacted. In some cases, it has been determined that it is beneficial to drop the mix from the pug mill onto the grade and let the pickup machine transfer it to the paver as this can reduce or eliminate frequent stopping and starting of the paver.

In another process, a reclaimer is used to rip up or chew up the pavement. The removed material is tilled or reclaimed (sometimes virgin aggregate is added) and foamed asphalt is sprayed onto the reclaimed mix, which is then deposited behind the reclaimer. In some cases, a grader is used to shape the finished mix for thickness and slope. In some instances, the material as deposited is compacted without shaping. This process produces a recycled mix that is suitable for correcting poor grades, adding depth to the compacted layer (when using additional aggregate) and generally obtaining a water shedding surface on which additional layers of hot mix asphalt can be placed.

In another process, a stationary foaming mixing system can be used in combination with milled material that is collected on site and brought back to a central mixing location. This process can be used to produce a cold mix that can be either grader or paver laid to produced a hard, water shedding surface on which to add a chip seal or an overlay. In each of these processes, a lubricating surfactant can be used in the foaming process.

Foaming Process

In some embodiments, a foamed asphalt binder is beneficial to the CIR process. A foamed asphalt binder can be produced using several different techniques. In one technique, a foamed asphalt binder is formed by injecting a small amount of water and compressed air into a very hot stream of asphalt binder which causes the asphalt binder to foam when the water/asphalt blend is sprayed onto the milled bituminous material. In this process, about 1 to 5 weight percent water is injected into virgin asphalt binder along with vigorous mixing of the components to create a foam. The resultant mix that is placed develops strength very quickly because of the relatively low level of water added to the asphalt binder to make the foam and because of the relatively rapid loss of water through evaporation caused by the heat of the asphalt.

In another technique, a foam is produced from an emulsion that includes about 60 to 70 weight percent asphalt binder and about 30-40 weight percent water combined at a temperature in a range of about 30° C. to 60° C. Use of an emulsion can result in effectively coating the milled material at or near about 100 percent level.

In some cases, quicker setting emulsions impart a chemical "break" to the emulsion which enables the emulsion to coat the milled material and then chemically bond the asphalt particles to the aggregate material and cause the water to break or separate from the asphalt. There can be a noticeably faster cure imparted to the emulsion system compared to conventional slow setting or medium setting emulsion mixed blends.

In some embodiments, lubricating surfactants can be added to the asphalt binder or to the water injected into the asphalt binder to enhance foaming and to lubricate and enhance spreading of the asphalt binder onto milled material particles. Consequently, recycled bituminous materials can be produced that provide rapid strength development while also providing about or up to 100 percent coating of particles and also provide the desired appearance and density. In some cases, the lubricating effect provided by the lubricating surfactants can prevent or substantially reduce the tendency of some foamed CIR mixtures to stick to the paver screed. Moreover, while foamed CIR may be performed using binders at approximately 360° F., the use of lubricating, foam enhancing additives can result in the reduction of the temperature needed for construction by as much as 60° F.

In some embodiments, a foamed asphalt binder can be produced by injecting water and compressed air, along with one or more lubricating surfactants, into a strewn of hot asphalt. The hot asphalt stream may be a virgin asphalt such as PG 52-34 binder. In some cases, the lubricating surfactant is added to the asphalt prior to injecting the water and compressed air. In some instances, the lubricating surfactant is added to the water prior to injection of the water. In some embodiments, the hot asphalt is flowing through a pipe or other structure, the water is injected into the hot asphalt stream via a first nozzle and the compressed air is injected into the hot asphalt stream via a second nozzle. In some cases, foaming may occur with injection of water in the absence of injection of compressed air.

Asphalt Binder

A variety of different asphalt binders are commercially available. As an example, several different asphalt binders are commercially available from a variety of sources. Non-limiting examples of asphalt binders are PG 52-34, PG 58-34, PG 64-28, PG 70-28, PG 76-28, PG 70-22 and PG 76-22. A particular asphalt binder is PG 52-34, which has an absolute viscosity (measured at 140° F.) of 540 Poise, a penetration (at 77° F.) of 236 dmm and a specific gravity (at 60° F.) of 1.03.

Lubricating Surfactants

A variety of lubricating surfactants can be used in producing foamed asphalt binders. Examples of suitable lubricating surfactants include naturally occurring compounds and more commonly synthesized chemical compounds from three categories of surfactants: detergents, wetting agents and emulsifiers. Surfactants can be specifically categorized as being anionic, cationic, amphoteric and nonionic.

Suitable anionic surfactants include but are not limited to fatty acids (saturated and unsaturated fatty acids), fatty acid pitch (stearic acid pitch), fatty acid derivatives (fatty acid esters and fatty acid sultanates), and organo phosphates (alkyl phosphates).

Suitable cationic surfactants include, but are not limited to, alkyl amines, alkyl quaternary ammonium salts, heterocyclic quaternary ammonium salts, amido amines, and non-nitrogenous sulfur or phosphorous derivatives.

Suitable amphoteric surfactants, which include an anionic molecular portion and a cationic molecular portion, include but are not limited to amino acids, amino acid derivatives, betain derivatives (alkylbetains and alkylaminobetains), imidazolines, and imidazoline derivatives.

Suitable nonionic surfactants include, but are not limited to, fatty acid ester bonds (SPANS and TWEENS), with surfactant ether bonds (alkylphenolpolyoxyethylenes and polyoxyethylenated alcohols), surfactants with amid bonds (alcanolamides, mono and diethanolamides and their derivatives), alkylenated oxide copolymers and polyoxyethyleneated mercaptans.

Other surfactants and non-surfactant additives can be found in U.S. patent application Ser. No. 11/871,782, filed Oct. 12, 2007 entitled WARM MIX ASPHALT BINDER COMPOSITIONS CONTAINING LUBRICATING ADDITIVES, which application is hereby incorporated by reference herein in its entirety.

In some embodiments, the lubricating surfactant is an ethoxylated diamine. An illustrative but non-limiting example of a suitable ethoxylated diamine is DT-3, or tris(2-hydroxyethyl)-N-tallow-alkyl-1,3-diaminopropane. In some embodiments, about 0.5 weight percent DT-3 can be used in the asphalt binder.

Compositions

In some embodiments, a foamed asphalt may be produced by injecting about 0.5 to 5 weight percent water and about 0.05 to about 3 weight percent of an ethoxylated diamine surfactant into a liquid asphalt stream. The liquid asphalt stream may be an asphalt binder such as PG 52-34. In some embodiments, compressed air at a pressure of about 20 to about 50 psi may also be injected into the liquid asphalt stream to enhance foaming. In some embodiments, during the foaming process, the liquid asphalt stream is at a temperature in the range of about 300° F. to about 380° F. In some cases, the liquid asphalt stream is at a temperature in the range of about 320° F. to about 360° F.

The resulting foamed asphalt may be combined with milled bituminous material (either on site or at a central location) at a rate of about 0.5 to 4 percent foamed asphalt binder by weight of milled bituminous material. This material, once laid and compacted, can achieve a density, measured two days after compaction, of at least about 88 to about 95 percent of the theoretical maximum density of the mix being placed.

EXAMPLE ONE

A trial run was conducted using the "train method" of cold-in-place recycling. A PR1000T Caterpillar milling machine was used to mill the existing pavement approximately 3.5 inches deep. A portable 3033 Cedar Rapids hammer mill crusher with a double screen deck was used to size the milled material to 1 inch and smaller size. A portable Barber Green pugmill with a twin shaft approximately 10 feet long was used to mix the milled material with the foamed asphalt binder. The foaming process was conducted using a Soter spray bar to inject water into the asphalt stream just prior to introduction of the asphalt into the milled material. After mixing the milled material with the foamed asphalt, the mix was placed in a windrow behind the pugmill and a pickup machine was used to transfer the mix to a paver which then laid the mix. A screed on the paver provided initial compaction and final compaction of the mix was accomplished with pneumatic and steel wheeled rollers.

The asphalt binder used was a PG 52-34 at a nominal temperature of 360° F. The asphalt was delivered to the project in a tanker and transferred to smaller tank designed to straddle the windrow and so move down the paving project as the entire milling and mixing train operates on the project. One to two percent water is added at the milling head to cool the head and keep down dust and another 1-2% water is added during the crushing phase of the operation. This water is in addition to the water injected at the spray head to produce the foamed asphalt. The ambient temperature on this project was 70° F. A total of 1.65% virgin 52-34 binder by weight was added to the milled material. For this test 0.5% DT-3 ethoxylated diamine lubricating additive was added by weight to the PG 52-34 binder.

At the spray bar in the mixing chamber the mixture color was a darker richer looking color compared to comparable r5uns performed without the lubricating additive. The mix was more workable in the windrow and picked up easily for transfer to the paver. There was good flow through the paver, flights and under the screed. The coating was uniform and darker in color than the same mix produced without the lubricating additive. The mat behind the paver was firmer than the comparable untreated mix. The mix rolled well and mat appeared firmer under the roller. There was an obvious color difference between the conventional foamed CIR mix and the CIR mix produced with the lubricating additive. Cores were taken from both the conventional and test sections 2 days after construction. These cores were tested for density. The average density of 5 cores in the conventional section was 127.3 lbs/ft3. The average density for 4 cores taken in the section produced with the lubricating additive was 129.0 lbs/ft$^3$.

EXAMPLE TWO

Another trial run was conducted using the "train method" of cold-in-place recycling. A portion of the existing pavement was milled, crushed and mixed with a foamed asphalt binder.

The foaming process was conducted by injecting water into the asphalt stream just prior to introduction of the asphalt into the milled material. After mixing the milled material with the foamed asphalt, the mix was transferred to a paver which then laid the mix. A screed on the paver provided initial compaction and final compaction of the mix was accomplished with pneumatic and steel wheeled rollers.

The asphalt binder used was a PG 52-34 at a nominal temperature of 360° F. The asphalt was delivered to the project in a tanker and transferred to smaller tank designed to straddle the windrow and so move down the paving project as the entire milling and mixing train operates on the project. One to two percent water is added at the milling head to cool the head and keep down dust and another 1-2% water is added during the crushing phase of the operation. This water is in addition to the water injected at the spray head to produce the foamed asphalt.

By mid-morning, as the pavement and air temperatures increased, it was found that the asphalt mix developed a tendency to stick to the screed as a result of the fines and binder increasing in viscosity. An attempt was made to resolve the problem by reducing the binder content from 1.2 or 1.3 gallons per foot to 0.8 gallons per foot. It was found that this reduced but did not eliminate the problem. Moreover, this resulted in a less-than-optimal binder content. It was found that by adding 0.3 weight percent of DT-3 to the binder, the binder content could be kept at 1.2 gallons per foot while eliminating the mix sticking problem.

Various modifications and additions can be made to the exemplary embodiments discussed without departing from the scope of the present invention. Although the embodiments described above refer to particular features, the scope of this invention also includes embodiments having different combinations of features and embodiments that do not include all of the above described features.

The invention claimed is:

1. A cold-in-place asphalt recycling method using a foamed asphalt binder, the method comprising the steps of:
   combining water and a lubricating surfactant, and optionally compressed air, with an asphalt binder heated to a reduced temperature of about 300° F. to about 380° F. to provide a foamed asphalt binder; and
   combining milled bituminous material with the foamed asphalt binder to provide a coated cold-in-place recycled paving material; and
   compacting the coated cold-in-place recycled paving material.

2. The method of claim 1, wherein water comprises about 0.5 to about 5 weight percent and the lubricating surfactant comprises about 0.05 to about 3 weight percent of the heated asphalt binder.

3. The method of claim 1, comprising combining the milled bituminous material with the foamed asphalt binder in an amount of about 0.5 to 4 percent asphalt binder by weight of milled bituminous material.

4. The method of claim 1, comprising injecting water and compressed air into heated asphalt binder containing the lubricating surfactant.

5. The method of claim 1, comprising injecting water, compressed air, and lubricating surfactant into heated asphalt binder.

6. The method of claim 1, comprising adding lubricating surfactant to the heated asphalt binder and then injecting water into the heated asphalt binder.

7. The method of claim 1, wherein the lubricating surfactant comprises a cationic, anionic or nonionic surfactant.

8. The method of claim 1, wherein the lubricating surfactant comprises an alkyl amine, alkyl quaternary ammonium salt, heterocyclic quaternary ammonium salt, amido amine or non-nitrogenous sulfur or phosphorous derivative.

9. The method of claim 1, wherein the lubricating surfactant comprises an ethoxylated diamine.

10. The method of claim 1, wherein the foamed asphalt binder is formed from about 0.5 to about 5 weight percent water and, the lubricating surfactant comprises about 0.05 to about 3 weight percent ethoxylated diamine.

11. The method of claim 1, wherein the lubricating surfactant reduces the temperature needed for paving by as much as 60° F.

12. The method of claim 1, wherein the asphalt is heated at a temperature of about 320° F. to about 360° F.

13. A cold-in-place asphalt recycling method for paving a recycled asphalt pavement surface, which method comprises:
producing a foamed asphalt binder by injecting water and a lubricating surfactant and optionally compressed air into a stream of an asphalt binder at a reduced temperature of about 300° F. to about 380° F.;
milling an existing pavement surface to provide milled bituminous material;
combining the foamed asphalt binder with the milled bituminous material to produce a recycled bituminous mix;
conveying the recycled bituminous mix into a paver;
laying the recycled bituminous mix onto an existing grade; and
compacting the recycled bituminous mix to form a recycled asphalt pavement surface.

14. The method of claim 13, further comprising combining virgin aggregate and the milled bituminous material with the foamed asphalt binder.

15. The method of claim 13, wherein the lubricating surfactant reduces the temperature needed for paving by as much as 60° F.

16. The method of claim 13, further comprising placing a hot mix asphalt layer on the recycled asphalt pavement surface.

17. The method of claim 13, wherein the asphalt is heated to a temperature of about 320° F. to about 360° F.

18. The method of claim 13, wherein the lubricating surfactant comprises a cationic, anionic or nonionic surfactant.

19. The method of claim 13, wherein the lubricating surfactant comprises an alkyl amine, alkyl quaternary ammonium salt, heterocyclic quaternary ammonium salt, amido amine or non-nitrogenous sulfur or phosphorous derivative.

20. The method of claim 13, wherein the lubricating surfactant comprises an ethoxylated diamine.

* * * * *